(12) United States Patent
Liu

(10) Patent No.: US 9,031,512 B2
(45) Date of Patent: May 12, 2015

(54) METHOD AND DEVICE FOR DETERMINING POWER CONSUMPTION OF COMMUNICATION SITE

(71) Applicant: Huawei Technologies Co., Ltd., Shenzhen, Guangdong (CN)

(72) Inventor: Xuanpeng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 13/720,590

(22) Filed: Dec. 19, 2012

(65) Prior Publication Data

US 2013/0109321 A1 May 2, 2013

Related U.S. Application Data

(63) Continuation of application No. PCT/CN2011/072943, filed on Apr. 18, 2011.

(51) Int. Cl.
*H04B 17/00* (2006.01)
*H04M 1/00* (2006.01)
*H04W 24/08* (2009.01)
*H04W 52/02* (2009.01)

(52) U.S. Cl.
CPC .......... *H04W 24/08* (2013.01); *H04W 52/0206* (2013.01); *Y02B 60/50* (2013.01)

(58) Field of Classification Search
USPC ............ 455/67.11, 561, 572, 574, 343.1
See application file for complete search history.

(56) References Cited

U.S. PATENT DOCUMENTS

| 6,993,294 | B2* | 1/2006 | Nobukiyo et al. ......... 455/67.11 |
| 7,310,524 | B2* | 12/2007 | Kurokawa ..................... 455/561 |
| 7,587,221 | B2* | 9/2009 | Mishina et al. ............... 455/561 |
| 2008/0177480 | A1 | 7/2008 | Infriccioli et al. | |
| 2009/0282275 | A1 | 11/2009 | Yermalayeu et al. | |

FOREIGN PATENT DOCUMENTS

| CN | 101080047 A | 11/2007 |
| CN | 101287524 A | 10/2008 |
| CN | 101299841 A | 11/2008 |
| CN | 101479686 A | 7/2009 |
| CN | 101867956 A | 10/2010 |

OTHER PUBLICATIONS

International Search Report in corresponding PCT Patent Application No. PCT/CN2011/072943 (Feb. 2, 2012).

* cited by examiner

*Primary Examiner* — Quochien B Vuong
(74) *Attorney, Agent, or Firm* — Leydig, Voit & Mayer, Ltd.

(57) ABSTRACT

In a mobile communication network, technologies are provided for determining power consumption of a communication site. An OSS system receives power consumption information of one or more devices and traffic volume information from a communication site. Then, the OSS determines power consumption of one or more virtue devices of the communication site, which are listed on a pre-configured device list according to power of the virtue devices, traffic volume information of the communication site, or both, wherein the a virtue device is not capable of monitoring power consumption, reporting power consumption, or both. Then the OSS determines power consumption of the communication site according to the power consumption information of the one or more devices received from the communication site and the power consumption of the virtual device in the communication site.

4 Claims, 3 Drawing Sheets

METHOD AND DEVICE FOR DETERMINING POWER CONSUMPTION OF COMMUNICATION SITE

CROSS-REFERENCE TO RELATED APPLICATIONS

This application is a continuation of International Patent Application No. PCT/CN2011/072943, filed Apr. 18, 2011, which is incorporated herein by reference in its entirety.

FIELD OF THE INVENTION

Embodiments of the present invention relate to communications technologies, and in particular, to a method and device for determining power consumption of a communication site.

BACKGROUND OF THE INVENTION

In a mobile communication network, accompanying with an increase of subscribers and a fast increase of data services, traffic volume of communication grows quickly and mobile network power consumption is in a growing tendency. In order to realize network energy saving and emission reduction, it is necessary to monitor power consumption of a communication site, so as to find a power consumption state of the base station and make an energy saving policy.

A configuration situation of a typical communication site is as follows: A base station in a communication site includes a baseband unit module and a base station carrier module, and further includes a fan, a transmission device, and so on. The communication site is further configured with auxiliary devices such as a communication power supply, a solar energy power supply, a wind energy power supply, an equipment room power supply, and an equipment room air-conditioner. The auxiliary devices are connected to an auxiliary monitoring interface module, where the auxiliary monitoring interface module is configured to report power consumption of the auxiliary devices. The auxiliary monitoring interface module reports the power consumption of the auxiliary device to a power consumption reporting module of the base station. The power consumption reporting module of the base station sends power consumption of the base station and the power consumption of the auxiliary device to an Operating and supporting system (OSS).

However, part of the auxiliary devices of the communication site have a power consumption monitoring capability and part of the auxiliary devices do not have a power consumption reporting capability, therefore, part of the auxiliary devices cannot realize power consumption reporting through the power consumption reporting module. In the same way, the baseband unit module and the base station carrier module in the base station may realize power consumption reporting through the power consumption reporting module, but the transmission device and the fan cannot report power consumption. Therefore, power consumption reported to the OSS by the base station cannot completely reflect power consumption of the communication site.

SUMMARY OF THE INVENTION

Embodiments of the present invention provide a method and device for determining power consumption of a communication site, so as to solve a defect that in the prior art, power consumption of a communication site, which is obtained by an OSS, is not complete.

An embodiment of the present invention provides a method for determining power consumption of a communication site, where the method includes:

receiving power consumption reported by the communication site;

determining power consumption of virtual devices in the communication site according to power of the virtual devices in the communication site and/or traffic volume of the communication site, where the virtual devices include one or more devices which are not capable of monitoring power consumption monitoring and one or more devices which are not capable of reporting power consumption in the communication site; and the traffic volume of the communication site is traffic volume of the communication site at a time point when the power consumption is reported; and determining power consumption of the communication site according to the power consumption reported by the communication site and the power consumption of the virtual devices in the communication site.

An embodiment of the present invention provides a device for determining power consumption of a communication site, where the method includes:

a power consumption receiving module, configured to receive power consumption reported by the communication site;

a virtual device power consumption calculation module, configured to determine power consumption of virtual devices in the communication site according to power of the virtual devices in the communication site and/or traffic volume of the communication site, where the virtual devices include a device without a power consumption monitoring capability and a device without a power consumption reporting capability in the communication site, and the traffic volume of the communication site is traffic volume of the communication site at a time point when the power consumption is reported; and a power consumption calculation module, configured to determine power consumption of the communication site according to the power consumption reported by the communication site and the power consumption of the virtual devices in the communication site.

In the embodiments of the present invention, the device without a power consumption monitoring capability and the device without a power consumption reporting capability in the communication site are defined as virtual devices. After receiving the power consumption reported by the communication site, an OSS power consumption platform obtains the traffic volume of the communication site at the time point when the power consumption is reported and determines power consumption of each virtual device respectively according to the traffic volume of the communication site and power of each virtual device. After aggregating the reported power consumption with power consumption of all virtual devices, the OSS power consumption platform obtains total power consumption of the communication site. Therefore, in the embodiments of the present invention, the OSS power consumption platform implements statistics of the total power consumption of the communication site, so that an appropriate energy saving policy may be made for the communication site.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following.

Apparently, the accompanying drawings in the following description are only some embodiments of the present invention, and persons of ordinary skill in the art may still derive other drawings from these accompanying drawings without creative efforts.

DETAILED DESCRIPTION OF THE EMBODIMENTS

In order to make the objectives, technical solutions, and advantages of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative efforts shall fall within the protection scope of the present invention.

Figure 1:
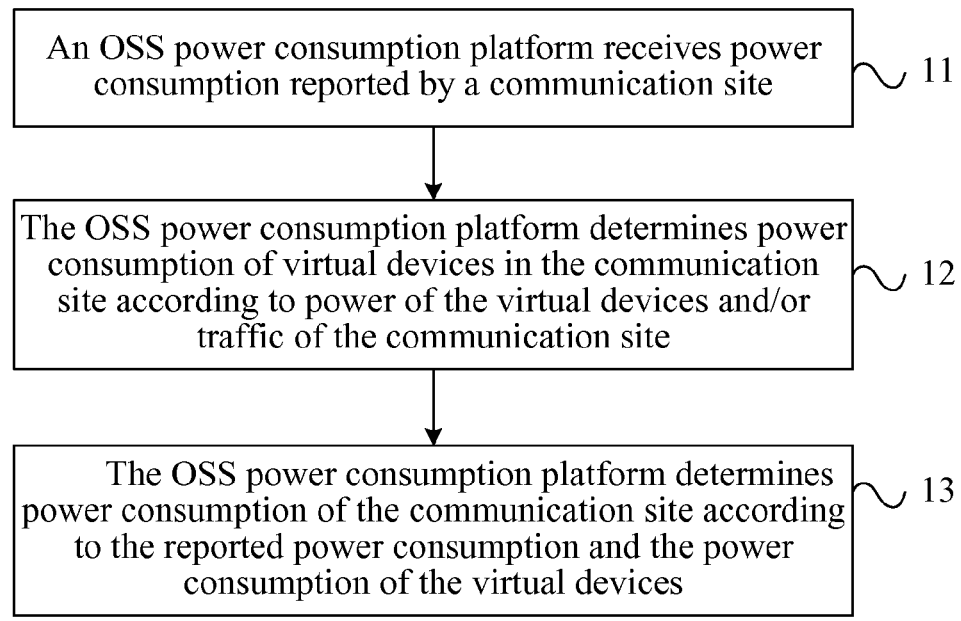
FIG. 1 is a flow chart of a method for determining power consumption of a communication site according to an embodiment of the present invention.

FIG. 1 is a flow chart of a method for determining power consumption of a communication site according to an embodiment of the present invention. As shown in FIG. 1, this embodiment includes:

Step 11: An OSS power consumption platform receives power consumption reported by a communication site.

The communication site reports power consumption of the communication site to the OSS power consumption platform, and the power consumption reported by the communication site includes power consumption of one or more devices which are capable of monitoring and reporting their power consumption in the communication site.

Step 12: The OSS power consumption platform determines power consumption of one or more virtual devices in the communication site according to power of the virtual devices and/or traffic volume of the communication site.

In the communication site, some devices is capable of reporting their power consumption, but not capable of monitoring their power consumption. For example, a transmission device and a power amplification device that may report information to a base station in the communication site, they are capable of reporting power consumption but they are not capable of monitoring power consumption. Therefore, power consumption reported to the OSS by the base station does not include power consumption of these devices. Some devices are capable of monitoring power consumption but they are not capable of reporting power consumption. For example, an equipment room power supply in the communication site is capable of displaying its power consumption on a local monitor screen but is not capable of reporting its power consumption to the OSS. In the communication site, some devices are not capable of monitoring power consumption and reporting power consumption, such as a fan and an equipment room air-conditioner. In this embodiment of the present invention, the one or more virtual devices include: one or more devices which are not capable of monitoring power consumption and one or more devices which are not capable of reporting power consumption reporting in the communication site, such as a transmission device, a power amplification device, a fan, an equipment room power supply, and an equipment room air-conditioner, etc.

The traffic volume of the communication site is traffic volume of the communication site at a time point when the power consumption is reported. The traffic volume of the communication site may include at least one of the following: a circuit service volume, temperature, and radio output power of the communication site.

Power consumption of each virtual device may be related to power of the virtual device and the traffic volume of the communication site. The power of a virtual device is power after the virtual device is powered on and before service processing is performed, and is related to configuration and type of the virtual device. For example, a first virtual device is a device with fixed power consumption, such as a transmission device, etc.; and the first virtual device's power consumption is fixed and unchangeable given the same configuration and type. The power consumption of the first virtual device is related to the configuration and type rather than the traffic volume of the communication site. After being configured, no matter whether data being received or sent, the transmission device is in a working state and its power consumption is power consumption in the case of current configuration. If the virtual device is a device with fixed power consumption, the OSS power consumption platform determines power consumption of the virtual device in the communication site according to power of the virtual device in the communication site.

Some virtual devices are devices with changeable power consumption. These virtual devices' power consumption is not just related to the configuration and type, but also related to the traffic volume of the communication site. A second virtual device is a device with a first order linear relationship between its power consumption and the traffic volume of the communication site, such as a power amplification device. The second virtual device's power consumption is related to the traffic volume of the communication site in a first order linear relationship given the same configuration and type. A third virtual device is a device with a second order linear relationship between its power consumption and the traffic volume of the communication site, such as a fan. The third virtual device's power consumption is related to the traffic volume of the communication site in a second order linear relationship given the same configuration and type. Some other devices are fourth virtual devices such as an equipment room power supply. For the fourth virtual devices, in the case that configuration and types are the same, power consumption needs to be obtained by searching a traffic volume and power consumption mapping table. In the communication site, for persons skilled in the art, a device with another relationship between power consumption and the traffic volume of the communication site may also exist, which is not repeated herein.

If the virtual device is a device with changeable power consumption, the OSS power consumption platform determines power consumption of the virtual device in the communication site according to power of the virtual device in the communication site and the traffic volume of the communication site.

After the OSS power consumption platform determines power consumption of each virtual device in the communication site according to the power of the virtual device and the traffic volume of the communication site, total power consumption of all virtual devices may also be calculated. In this embodiment, according to the power consumption of the first virtual devices, the power consumption of the second virtual devices, the power consumption of the third virtual devices, and the power consumption of the fourth virtual devices in the communication site, the OSS power consumption platform obtains power consumption of all virtual devices in the communication site.

Step 13: The OSS power consumption platform determines power consumption of the communication site according to the reported power consumption and the power consumption of the virtual devices.

In this embodiment of the present invention, the devices without power consumption monitoring capability and the devices without power consumption reporting capability in the communication site are defined as virtual devices. After receiving the power consumption reported by the communication site, the OSS power consumption platform obtains the traffic volume of the communication site at the time point when the power consumption is reported, determines the power consumption of the virtual devices according to the traffic volume of the communication site and the power of the virtual devices, and obtains the power consumption of the communication site according to the reported power consumption and the power consumption of the virtual devices. Therefore, in this embodiment of the present invention, the OSS power consumption platform implements statistics of the power consumption of the communication site, so that an appropriate energy saving policy may be made for the communication site.

Figure 2:
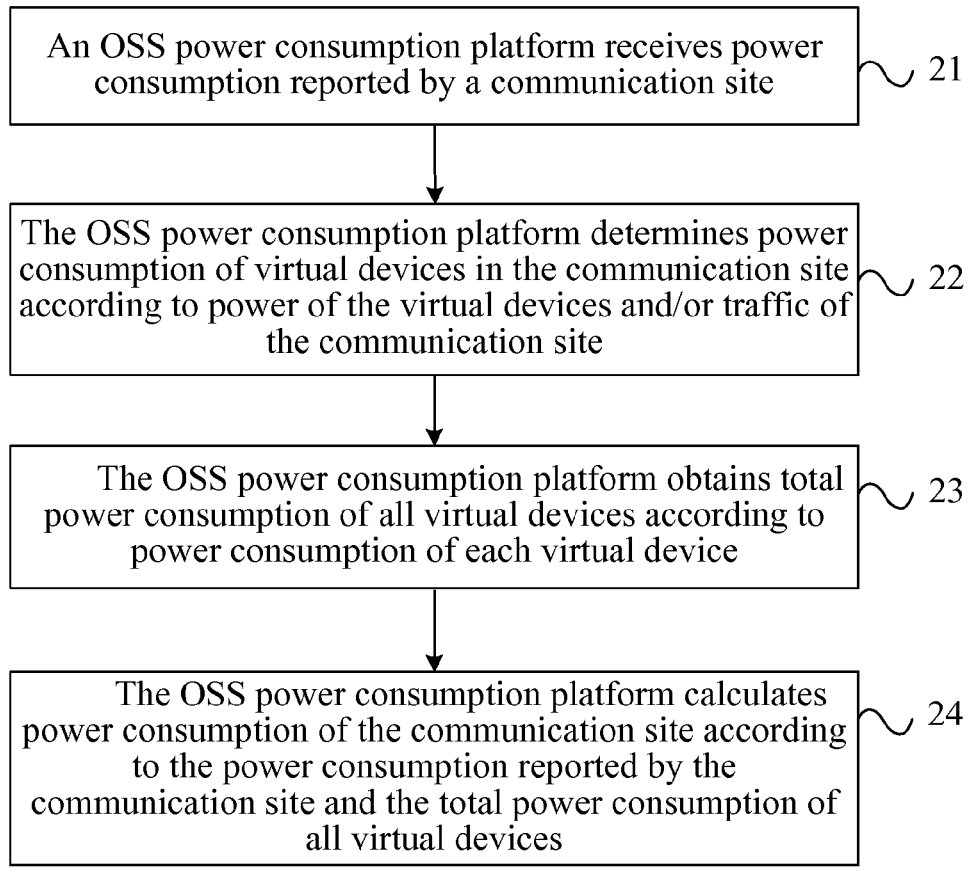
FIG. 2 is a flow chart of another method for determining power consumption of a communication site according to an embodiment of the present invention.
Figure 3:
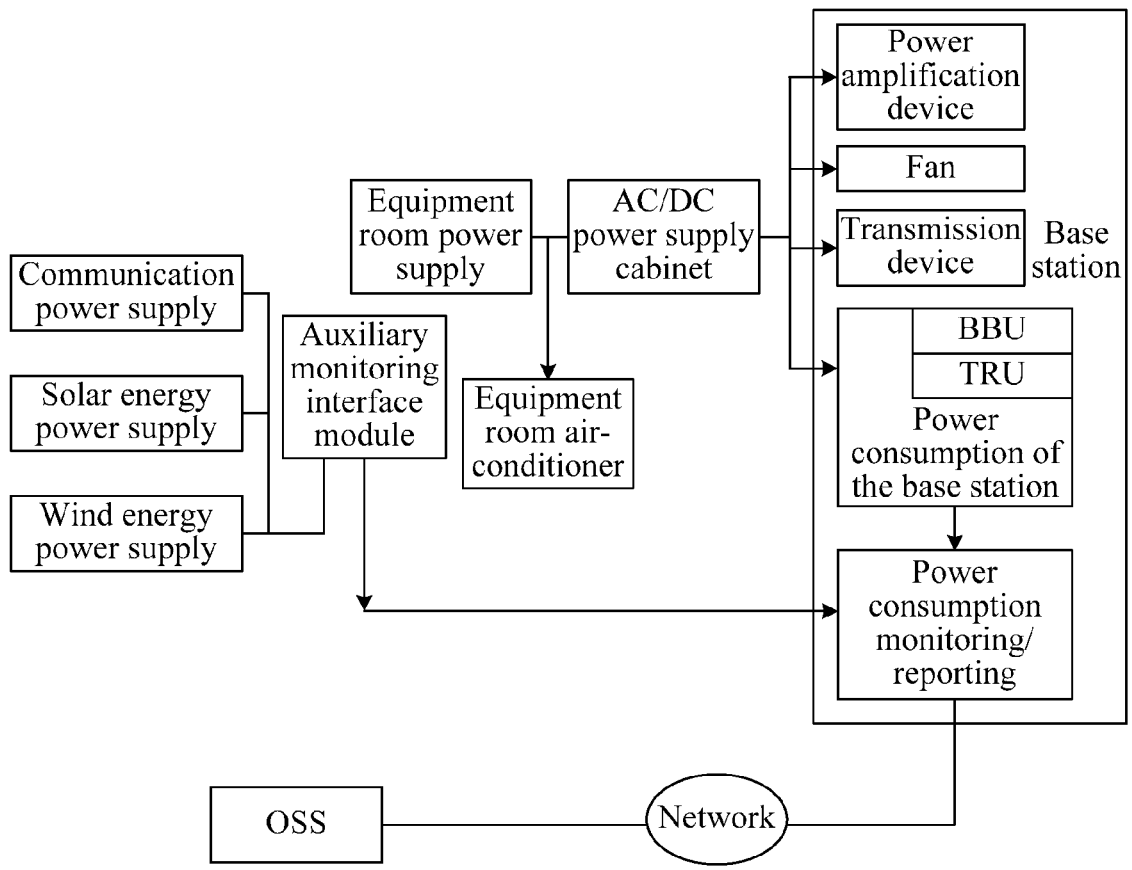
FIG. 3 is an application scenario diagram of another method for determining power consumption of a communication site according to an embodiment of the present invention.

FIG. 2 is a flow chart of another method for determining power consumption of a communication site according to an embodiment of the present invention; and FIG. 3 is an application scenario diagram of another method for determining power consumption of a communication site according to an embodiment of the present invention.

As shown in FIG. 2, this embodiment includes:

Step 21: An OSS power consumption platform receives power consumption reported by a communication site.

A base station in the communication site reports power consumption of the communication site and traffic volume of the communication site to the OSS power consumption platform through a management channel of a base station controller. The power consumption reported by the communication site includes: power consumption of devices which are capable of monitoring power consumption and reporting power consumption in the communication site. In addition, the base station may also periodically report the traffic volume of the communication site together with the power consumption of the communication site to the OSS. After receiving the traffic volume reported by the communication site, the OSS platform stores the traffic volume for query and analysis.

In the communication site, some devices are not capable of monitoring power consumption, some devices are capable of monitoring power consumption but not capable of reporting power consumption, or some devices are not capable of reporting power consumption and monitoring power consumption. In FIG. 3, virtual devices include: a transmission device, a power amplification device, a fan, an equipment room power supply, an equipment room air-conditioner, and so on. In FIG. 3, devices which are capable of reporting power consumption and monitoring power consumption include: a baseband unit module (BBU), a base station carrier module (TRU), a communication power supply, a solar energy power supply, a wind energy power supply, and so on. The communication power supply, the solar energy power supply, and the wind energy power supply may report monitored power consumption to the base station, and the base station reports the monitored power consumption to the OSS power consumption platform.

In this embodiment, power consumption of the virtual devices in the communication site is determined through the following steps.

Step 22: The OSS power consumption platform determines power consumption of the virtual devices in the communication site according to power of the virtual devices and/or traffic volume of the communication site.

The traffic volume of the communication site is traffic volume of the communication site at a time point when the power consumption is reported.

In this embodiment, the OSS power consumption platform includes a device list of the communication site. In order to make statistics on power consumption of each virtual device, the OSS power consumption platform, according to a feature of each device, defines devices which are not capable of reporting power consumption and devices which are not capable of monitoring power consumption in the device list as virtual devices. By analyzing power consumption of the virtual devices and the traffic volume of the communication site, in this embodiment, the virtual devices are classified into four main categories and a corresponding relationship between power consumption of a virtual device and the traffic volume is established for each virtual device.

Specifically, a virtual device power consumption function table, as shown in Table 1, may be established, where P0 is power of a virtual device in the case of certain configuration and a certain type. In Table 1, a virtual device category may correspond to multiple virtual devices; and virtual devices belonging to the same category have the same corresponding relationship between their power consumption and the traffic volume. In this embodiment, one or more first virtual devices are devices with fixed power consumption. The power consumption of the one or more first virtual devices is fixed and unchangeable given the same configuration and type. A second virtual device, a third virtual device, and a fourth virtual device are devices with changeable power consumption. Their power consumption is not just related to their configurations and types, but also related to traffic volume of a communication site given the same configurations and types. Specifically, a first order linear relationship $P=P0+k1*ta$ is set between power consumption of the second virtual device, such as a power amplification device, and the traffic volume of the communication site. A second order linear relationship $P=P0+k1\times ta+k2\times ta^2$ is set between power consumption of the third virtual device, such as a fan, and the traffic volume of the communication site. Some other devices are set as fourth virtual devices, such as an equipment room power supply. For the fourth virtual devices, in the case that configuration and types are the same, power consumption needs to be obtained by searching a traffic volume and power consumption mapping table. In the communication site, for persons skilled in the art, a device with another relationship between power consumption and the traffic volume of the communication site may also exist, which is not repeated herein.

TABLE 1

Virtual device power consumption function table

| Virtual Device Category | Virtual Device | Power Consumption Function |
|---|---|---|
| First virtual device | Transmission device, ... | $P = P0$ |
| Second virtual device | Power amplification device, ... | $P = P0 + k1 \times ta$ |
| Third virtual device | Fan, ... | $P = P0 + k1 \times ta + k2 \times ta^2$ |
| Fourth virtual device | Equipment room power supply ... | Search the traffic volume and power consumption mapping table |

In this embodiment, a relationship between the traffic volume and the power consumption of the fourth virtual device (such as an equipment room power supply or an equipment room air-conditioner) may be obtained through practical measurement and analysis, as shown in Table 2.

TABLE 2

Traffic volume and power consumption mapping table

| Traffic volume | Power Consumption |
|---|---|
| $ta_1$ | p1 |
| $ta_2$ | p2 |
| $ta_3$ | P3 |
| ... | ... |
| $ta_n$ | Pn |

For each virtual device in the device list of the communication site, the OSS power consumption platform determines power consumption of a virtual device according to power of the virtual device and/or the traffic volume of the communication site and with reference to a virtual device category to which each virtual device belongs. In this embodiment, if the virtual device is a first virtual device with fixed power consumption, the OSS power consumption platform determines power consumption of the virtual device in the communication site according to power of the virtual device in the communication site. If the virtual device is a device with changeable power consumption, the OSS power consumption platform determines power consumption of the virtual device in the communication site according to power of the virtual device in the communication site and the traffic volume of the communication site. Specifically, the OSS power consumption platform determines power consumption of the second virtual device in the communication site according to a first order linear relationship between power consumption of the second virtual device and the traffic volume of the communication site. The OSS power consumption platform determines the power consumption of the third virtual device in the communication site according to a second order linear relationship between power consumption of the third virtual device and the traffic volume of the communication site. The OSS power consumption platform determines power consumption of the fourth virtual device in the communication site according to the traffic volume and power consumption mapping table.

Step 23: The OSS power consumption platform obtains total power consumption of all virtual devices according to power consumption of each virtual device.

In this embodiment, the OSS power consumption platform may obtain power consumption of all virtual devices in the communication site after aggregating the power consumption of the first virtual devices, the power consumption of the second virtual devices, the power consumption of the third virtual devices, and the power consumption of the fourth virtual devices in the communication site.

Step 24: The OSS power consumption platform calculates power consumption of the communication site according to the power consumption reported by the communication site and the total power consumption of all virtual devices.

After receiving the power consumption reported by the communication site, the OSS power consumption platform obtains the traffic volume of the communication site at the time point when the power consumption is reported, and determines power consumption of each virtual device in the device list of the communication site according to the power of the virtual device and/or the traffic volume of the communication site and with reference to the virtual device category to which each virtual device belongs. The OSS power consumption platform obtains the power consumption of the communication site according to the reported power consumption and the power consumption of all virtual devices. Therefore, in this embodiment of the present invention, the OSS power consumption platform implements statistics of the power consumption of the communication site, so that an appropriate energy saving policy may be made for the communication site.

Figure 4:
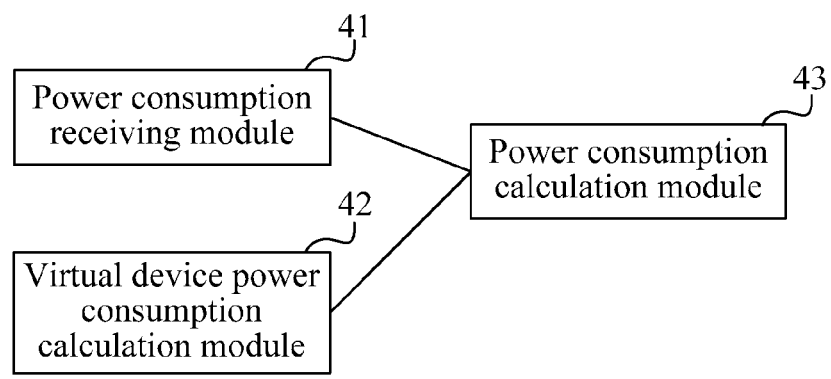
FIG. 4 is a schematic structural diagram of a device for determining power consumption of a communication site according to an embodiment of the present invention.

FIG. 4 is a schematic structural diagram of a device for determining power consumption of a communication site according to an embodiment of the present invention. As shown in FIG. 4, this embodiment includes: a power consumption receiving module 41, a virtual device power consumption calculation module 42, and a power consumption calculation module 43.

The power consumption receiving module 41 is configured to receive power consumption reported by a communication site.

The power consumption reported by the communication site is power consumption of a device with both a power consumption monitoring capability and a power consumption reporting capability.

The virtual device power consumption calculation module 42 is configured to determine power consumption of virtual devices in the communication site according to power of the virtual devices and/or traffic volume of the communication site.

The virtual devices include: a device without a power consumption monitoring capability and a device without a power consumption reporting capability in the communication site, such as a transmission device, a power amplification device, a fan, an equipment room power supply, and an equipment room power supply.

The traffic volume of the communication site is traffic volume of the communication site at a time point when the power consumption is reported. Power consumption of each virtual device may be related to power of the virtual device and/or the traffic volume of the communication site. In this embodiment, it is set that a first virtual device is a device with fixed power consumption, and a second virtual device, a third virtual device, and a fourth virtual device are devices with changeable power consumption. In the case that configuration and types are the same, a first order linear relationship $P=P0+k1*ta$ is set between power consumption of the second virtual device and the traffic volume of the communication site, such as a power amplification device. A second order linear relationship $P=P0+k1 \times ta+k2 \times ta^2$ is set between power consumption of the third virtual device and the traffic volume of the communication site, such as a fan. Some other devices are set as fourth virtual devices such as an equipment room power supply. For the fourth virtual devices, in the case that configuration and types are the same, power consumption needs to be obtained by searching a traffic volume and power consumption mapping table. In the communication site, for persons skilled in the art, a device with another relationship between power consumption and the traffic volume of the communication site may also exist, which is not repeated herein.

The power consumption calculation module 43 is configured to determine power consumption of the communication site according to the power consumption received by the power consumption receiving module 41 and the power consumption of the virtual devices in the communication site, where the power consumption of the virtual devices in the communication site is determined by the virtual device power consumption calculation module 42.

In this embodiment of the present invention, the device without a power consumption monitoring capability and the device without a power consumption reporting capability in the communication site are defined as virtual devices. After the power consumption receiving module 41 receives the power consumption reported by the communication site, the virtual device power consumption calculation module 42 obtains the traffic volume of the communication site at the time point when the power consumption is reported, and determines power consumption of each virtual device according to the traffic volume of the communication site and power of each virtual device. The power consumption calculation module 43 obtains the power consumption of the communication site according to the reported power consumption and the power consumption of the virtual devices. Therefore, in this embodiment of the present invention, the OSS power consumption platform implements statistics of the power consumption of the communication site, so that an appropriate energy saving policy may be made for the communication site.

Figure 5:
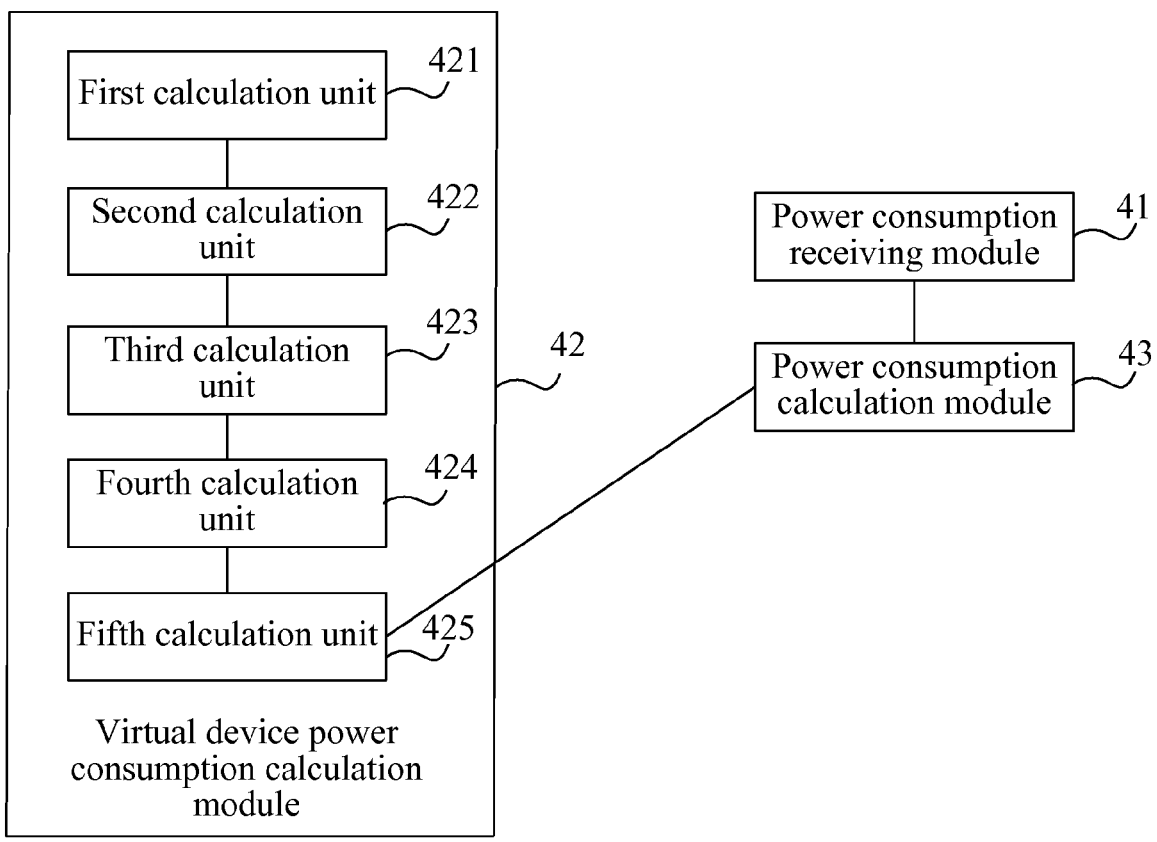
FIG. 5 is a schematic structural diagram of a virtual device power consumption calculation module in FIG. 4.

FIG. 5 is a schematic structural diagram of a virtual device power consumption calculation module in FIG. 4. As shown in FIG. 5, a virtual device power consumption calculation module 42 includes: a first calculation unit 421, a second calculation unit 422, a third calculation unit 423, a fourth calculation unit 424, and a fifth calculation unit 425.

The first calculation unit 421 is configured to determine power consumption of a first virtual device according to power of the first virtual device, where the first virtual device is a device with fixed power consumption in a communication site.

The second calculation unit 422 is configured to determine power consumption of a second virtual device according to power of the second virtual device and traffic volume of the communication site, where there is a first order linear relationship between the power consumption of the second virtual device and the traffic volume of the communication site.

The third calculation unit 423 is configured to determine power consumption of a third virtual device according to power of the third virtual device and the traffic volume of the communication site, where there is a second order linear relationship between the power consumption of the third virtual device and the traffic volume of the communication site.

The fourth calculation unit 424 is configured to determine, according to the traffic volume of the communication site, power consumption of a fourth virtual device by searching a traffic volume and power consumption mapping table.

The fifth calculation unit 425 is configured to obtain power consumption of all virtual devices in the communication site according to the power consumption of the first virtual device, the power consumption of the second virtual device, the power consumption of the third virtual device, and the power consumption of the fourth virtual device.

In this embodiment of the present invention, each unit determines power consumption of each virtual device in a device list of the communication site according to the power of the virtual device and the traffic volume of the communication site. According to the reported power consumption and the power consumption of all virtual devices, power consumption of the communication site is obtained. Therefore, in this embodiment of the present invention, statistics of the power consumption of the communication site is implemented, so that an appropriate energy saving policy may be made for the communication site.

Those of ordinary skill in the art may understand that all or a part of the steps of the foregoing method embodiments may be implemented by a program instructing relevant hardware. The program may be stored in a computer readable storage medium. When the program runs, the steps of the foregoing method embodiments are performed. The storage medium may include any medium that is capable of storing program codes, such as a ROM, a RAM, a magnetic disk, or an optical disk.

Finally, it should be noted that the foregoing embodiments are merely used for describing the technical solutions of the present invention, but are not intended to limit the present invention. It should be understood by persons of ordinary skill in the art that although the present invention has been described in detail with reference to the foregoing embodiments, modifications may still be made to the technical solutions described in the foregoing embodiments, or equivalent replacements may be made to some technical features in the technical solutions; however, these modifications or replacements do not make the essence of the corresponding technical solutions depart from the spirit and scope of the technical solutions in the embodiments of the present invention.

What is claimed is:

1. In a mobile communication network, a method, executed by an operating and supporting system (OSS), for determining power consumption of a communication site, comprising:
   receiving, from the communication site, power consumption information of one or more devices of the communication site;
   receiving, from the communication site, traffic volume information of the communication site;
   determining power consumption of one or more virtue devices of the communication site, which are listed on a pre-configured device list, according to at least one of: (a) power of the virtue devices, and (b) the traffic volume information of the communication site, wherein a virtue device is not capable of implementing at least one of the steps of (i) monitoring its power consumption, and (ii) reporting its power consumption wherein the virtual device is a third virtual device with a second order linear relationship between power consumption of the third virtual device and the traffic volume of the communication site, or the virtual device is a fourth virtual device and power consumption of the fourth virtual device is obtained by searching a traffic volume and power consumption mapping table; and
   determining the power consumption of the communication site according to the power consumption information of the one or more devices received from the communication site and the power consumption of the virtual device in the communication site.

2. The method according to claim 1, wherein the traffic volume information of the communication site comprises at least one of the following: a circuit service volume, temperature information, and radio output power of the communication site.

3. A computer program product comprising a non-transitory computer readable medium having stored thereon computer executable instructions that when executed implement the following steps for determining power consumption of a communication site:
   receiving, from the communication site, power consumption information of one or more devices of the communication site;
   receiving, from the communication site, traffic volume information of the communication site;
   determining power consumption of one or more virtue devices of the communication site, which are listed on a pre-configured device list, according to at least one of (a) power of the virtue devices, (b) the traffic volume information of the communication site, wherein a virtue device is not capable of implementing at least one of the steps of (i) monitoring its power consumption, and (ii) reporting its power consumption wherein the virtual device is a third virtual device with a second order linear relationship between power consumption of the third virtual device and the traffic volume of the communication site, or the virtual device is a fourth virtual device and power consumption of the fourth virtual device is obtained by searching a traffic volume and power consumption mapping table; and
   determining the power consumption of the communication site according to the power consumption information of the one or more devices received from the communication site and the power consumption of the virtual device in the communication site.

4. The computer program product according to claim 3, wherein the traffic volume of the communication site comprises at least one of the following: a circuit service volume, temperature information, and radio output power of the communication site.

* * * * *